United States Patent [19]

Grybek et al.

[11] 3,884,674

[45] *May 20, 1975

[54] COMPOSITION AND METHOD FOR TREATING PLANTS AND TREES

[75] Inventors: Roland S. Grybek; Frederick B. Johnston, both of Tampa, Fla.

[73] Assignee: Marketing and Research Services, Inc., Coral Gables, Fla.

[ * ] Notice: The portion of the term of this patent subsequent to Nov. 27, 1988, has been disclaimed.

[22] Filed: Nov. 7, 1972

[21] Appl. No.: 304,480

Related U.S. Application Data

[63] Continuation-in-part of Ser. Nos. 829,771, June 2, 1969, Pat. No. 3,712,802, Ser. No. 804,717, March 5, 1969, abandoned, and Ser. No. 417,215, Dec. 9, 1964, abandoned.

[52] U.S. Cl. .......................... 71/113; 71/96; 71/115
[51] Int. Cl. .............................................. A01n 9/24
[58] Field of Search .............................. 71/113, 115

[56] References Cited
UNITED STATES PATENTS

| | | | |
|---|---|---|---|
| 3,148,049 | 9/1964 | Herschler et al. | 71/113 |
| 3,460,936 | 8/1969 | Abramitis | 71/76 |
| 3,712,802 | 1/1973 | Grybek et al. | 71/79 |

OTHER PUBLICATIONS

Bragina, et al., Chem. Abst., Vol. 58, (1963). 6134 g

*Primary Examiner*—Lewis Gotts
*Assistant Examiner*—Catherine L. Mills
*Attorney, Agent, or Firm*—Fidelman, Wolffe & Leitner

[57] ABSTRACT

Partial synchronization of the maturation of fruits and fruiting vegetables is attained by treating the plant during its development with at least one compound of the formula $$R(CH_2)_x COCOOH$$

Where R is alkyl, aryl or hetero-N-cyclic, and where $x$ is 0 to 3.

1 Claim, No Drawings

COMPOSITION AND METHOD FOR TREATING PLANTS AND TREES

This application is a continuation-in-part, in turn, of the following applications: Ser. No. 829,771, filed June 2, 1969, now U.S. Pat. No. 3,712,802. Ser. No. 804,717, filed Mar. 5, 1969, now abandoned and Ser. No. 417,215, filed Dec. 9, 1964 now abandoned.

The present invention relates to a composition and method for partially synchronizing development and maturity of fruits and vegetables. More particularly, it relates to a technique whereby fruits and vegetables can be brought to harvest under planned and controlled conditions to yield maximum production at a single harvest.

Considerable effort has been devoted to the automation of farming and the harvesting of fruits and vegetables has been no exception to this trend. It has, however, proved quite difficult to economically justify the application of mechanical harvesting techniques in most agricultural contexts because of the nature of plant growth and development. At any particular point in the development of the crop, there is always a substantial portion of underdeveloped, undersized fruit which need additional growth time to mature and another portion which is overdeveloped, overripe and which should have been picked earlier. There is no fashion in which a mechanical harvest can avoid taking undersize fruit, which is wasted, as is the overripe portion of the crop. It is also difficult to determine the optimum time for machine harvesting, i.e. the time at which the proportion of marketable fruit is at a maximum.

It is accordingly an object of the present invention to provide a method for synchronizing the development and maturation of fruits and fruiting vegetables.

A further object is to provide a technique which will maximize the proportion of marketable fruit at a single clearly defined time in order to maximize yield by machine harvest.

These and still other objects are attained by the present invention wherein a fruit bearing plant is treated with at least one alpha-keto acid, of the general formula $$R(CH_2)_x COCOOH,$$

where $x$ is 0 to 3, preferably 1 or 2, and

R is selected from the group consisting of alkyl, branched or straight chain, aryl, and hetero-N-cyclic.

The alpha-keto acid is supplied to the plant in minor amounts in a carrier medium in the early stages of growth. Simultaneous application, even in a single dosage, over an entire field, results in dramatic concentration of the yield at maturity in a narrow time span, with considerably reduced proportions of unmarketable culls.

The carrier medium can be simply water or a nutrient or fertilizing liquid in which the alpha-keto acid is dissolved or an inert or nutrient solid upon which the alpha-keto acid is deposited. The nature of the carrier is of no particular significance to the present invention so long as it does not react with or alter the active component.

The amount of alpha-keto acid required to produce the desired result is quite small, i.e. on the order of about 0.5–1.0 mg per plant. While larger amounts can be used without deleterious effect and, indeed, may even be desirable from the standpoint of materials handling and related parameters, it has not appeared that there is any functional benefit to be obtained from larger dosages. Multiple doses can, however, be useful when applied at weekly or bi-weekly intervals. More than three applications do not appear advantageous and a single application will suffice. Application can be to foliage or to the root zone soil or both and preferably should be made as early in the plant's development as possible after the appearance of true leaves. Later applications are less effective and in no event should be delayed until fruiting has occurred or the synchronization will be minimal. If at all possible, application should precede flowering.

Among the alpha-keto acids employed in conjunction with the present invention, those which showed excellent ability to synchronize maturity of fruiting plants include phenylpyruvic acid, $\alpha$-keto phenyl acetic acid, $\alpha$-keto-$\beta$-hydroxy-$\beta$-phenyl propionic acid, $\beta$-hydroxypyruvic acid, $\alpha$-keto-$\beta$-hydroxybutyric acid, indolepyruvic acid, p-hydroxyphenyl pyruvic acid, $\alpha$-keto isovaleric acid, phenyl glyoxylic acid and mixtures thereof.

While the present invention is particularly of value when utilized in conjunction with mechanical harvesting, there are advantages to usage where multiple hand harvests are to be employed as well. The concentration of yield enables each single hand harvest to be more productive and more efficiently utilize labor. In addition, for each fruit set, fewer harvesting passes will be required to fully realize the productivity potential of the crop.

EXAMPLE

Operation of the present invention is detailed in the following specific example which will serve to illustrate the features of significance to those of ordinary skill in the art. The example is intended only to be illustrative in order to facilitate an understanding of how the invention is to be practiced and to enable those of ordinary skill to practice the invention and accordingly should not be construed as limiting upon the scope of the invention.

Young tomato plants, of breeding line 2153-F5, were grown in an artificial medium of peat, vermiculite, and essential nutrients in peat pots under a controlled environment until sufficiently developed to transplant (development of at least about two true leaves). The young plants were transplanted to a field of acres at a density of 19,300 plants per acre. A randomized block design with four replications was arranged: an untreated control and three areas for treatment with formulations of $\alpha$-keto acids in accordance with the present invention.

The $\alpha$-keto acid formulations were as follows:

A. A mixture of $\alpha$-keto acids was prepared by aqueous nitrous acid oxidation of the following solution:

| | |
|---|---|
| tryptophane | 5.0% (wt.) |
| tyrosine | 0.3 |
| phenylalamine | 5.0 |
| phenyl glycine | 5.0 |
| histidine | 5.0 |
| [d-1] aspartic acid | 0.4 |
| threonine | 2.0 |
| phosphoric acid (85%) | 5.0 |
| water | q.v. |

The solution was adjusted to 200 ppm α-keto acids and 0.1 weight percent butylated hydroxytoluene (BHT) was added as an antioxidant to stabilize the mixture.

B. A similar formulation was prepared by dissolving in water equal parts by weight of α-keto phenyl acetic acid, keto succinic acid, β-hydroxy pyruvic acid, α-keto-β-hydroxy butyric acid and p-hydroxyphenyl pyruvic acid, adjusting to 200 ppm α-keto acids and adding 0.1% BHT.

C. A similar formulation was prepared by dissolving in water equal parts by weight phenyl glyoxylic acid and phenyl pyruvic acid, 200 ppm, and BHT, 0.1.%.

The control plot was treated with 0.1% BHT in water in the same fashion as the treated plots. For the entire project, usual commercial practices of irrigation and applications in insecticides, fungicides and herbicides were used during growth of the crops.

The solutions were applied as a foliar spray to complete run-off on all plants in three applications at 2, 4 and 6 week intervals after transplanting. Fruit was harvested 4 times by hand and the marketable yield per acre for each was determined.

It was observed that when treated with any of the solutions of the present invention that there was no statistical significance in total biological yield of the crop produced compared to the control, but there was a significant concentration of the marketable yield in the period of the third harvest when the present invention was employed while the crop was spread more broadly in the case of the control. In the third harvest, the treated crop yielded an increased marketable fruit production of 60% (Solution A), 56% (Solution B) and 54% (Solution C) when contrasted with the control. There was also noted a statistically significantly higher total yield of fruit of marketable quality and a higher total yield of U.S. No. 1 grade fruit from the use of the compositions A, B and C in accordance with the present invention.

What is claimed:

1. The method of synchronizing maturity of fruiting bodies of tomato plants comprising applying to said fruit bearing plants about 0.5 to 1.0 milligrams per plant of an aqueous solution of equal parts by weight of α-keto phenyl acetic acid, β-hydroxy pyruvic acid, α-keto-β-hydroxy butyric acid, and p-hydroxy phenyl pyruvic acid.

* * * * *